F. A. LYON.
DRAFT EQUALIZER.
APPLICATION FILED OCT. 22, 1919.

1,350,821. Patented Aug. 24, 1920.

INVENTOR
Frank A. Lyon
BY
HIS ATTORNEYS

UNITED STATES PATENT OFFICE.

FRANK A. LYON, OF MILFORD, NEW YORK.

DRAFT-EQUALIZER.

1,350,821.  Specification of Letters Patent.  Patented Aug. 24, 1920.

Application filed October 22, 1919. Serial No. 332,482.

*To all whom it may concern:*

Be it known that I, FRANK A. LYON, a citizen of the United States, residing at Milford, in the county of Otsego and State of New York, have invented an Improvement in Draft-Equalizers, of which the following is a specification.

This invention relates to a draft equalizer and is an improvement on the form of draft equalizer shown and described in Letters Patent No. 1,308,525, granted to me July 1, 1919. In carrying out the present invention, I employ a cross bar together with U-shaped straps pivotally connected thereto, and also pivotally connected to one another so as to be movable together relatively to the cross bar, there being a connection between the U-shaped straps and the load to be drawn, and the apparatus being so constructed as to be employed preferably with a three horse team so that the line of direction of the pull is substantially the same as the line of direction in which the load is drawn irrespective of the portion of the work which either animal may do. In the present instance however, I employ in addition to the hereinbefore named features chain slides or rollers in the U-shaped strap members, and also in the clevises at the ends of the cross bar, together with a series of chains which are passed over these rollers or chain slides in such a manner as to be adapted to be connected to the traces forming part of the harness of the animals with one chain connected to the outer trace of one outer animal and the corresponding trace of the intermediate animal, while the outer trace of the other outer animal is similarly connected to the corresponding trace of the intermediate animal, while the inner traces of the outer animals are connected by a separate chain and by so doing, as will be hereinafter described, the central or intermediate animal is caused to pull in conjunction with both outer animals and each outer animal pulls with the other.

Figure 1:
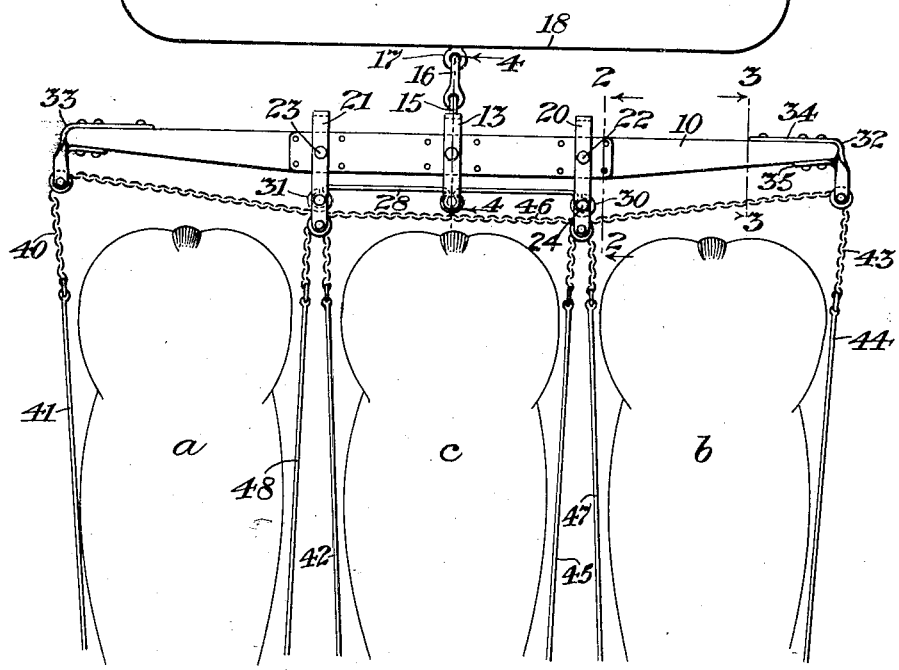
Figure 1 is a plan view of the draft equalizer comprising my present invention.
Figure 2:
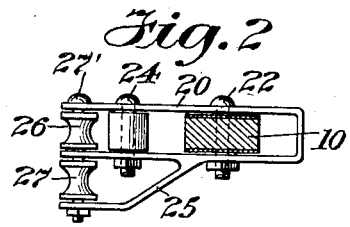
Fig. 2 is a cross section on line 2—2, Fig. 1.
Figure 3:
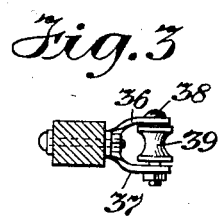
Fig. 3 is a cross section on line 3—3, Fig. 1.
Figure 4:
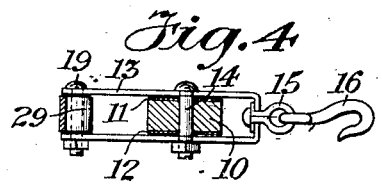
Fig. 4 is a cross section on line 4—4, Fig. 1.

Referring to the drawing, the draft equalizer comprising my present invention consists of a cross bar 10 in which in the upper face there is set a plate 11 and in the under or lower face a plate 12, these plates being secured to the cross bar in any suitable manner. Connected centrally with the cross bar is a U-shaped strap 13. This is connected to the cross bar by a bolt 14 which passes through the upper and lower members of the U-shaped strap and also through the plates 11 and 12 in the cross bar 10. At one end, the U-shaped strap is fitted with an eye 15 having a hook 16 adapted to be connected with an eye 17 secured to the body 18 of a cart or other load to be drawn. At the opposite end of the U-shaped strap, I employ a bolt 19 extending between and passing through the members of the strap for a purpose to be hereinafter indicated.

In addition to the U-shaped strap 13 which is centrally disposed of the cross bar, I employ auxiliary U-shaped straps 20 and 21. The strap 20 is pivotally connected to the cross bar by a bolt 22, and similarly the strap 21 is pivotally connected in the cross bar by a bolt 23, all of these U-shaped straps extending appreciable distances beyond the edges of the cross bar. At the ends of the U-shaped straps 20 and 21 which extends forward of the cross bar, I employ bolts 24 extending between the parts of the strap and passing through the same for a purpose to be hereinafter indicated. Also at this end of each auxiliary U-shaped strap, I employ a bracket 25 depending from the lower or under member of the strap. Between the extremities of each of these auxiliary straps at this end, there is a roller 26, and beneath this roller 26 and between the under or lower member of the U-shaped strap and the bracket 25 there is a roller 27, these rollers being secured in position by means of a bolt 27' which passes through the ends of the U-shaped strap and also the end of the bracket 25.

In order to connect the U-shaped straps so as to move or swing in unison relatively to the cross bar, I employ a rod 28, the central portion of which is connected to the bolt 19 at the outer end of the central U- shaped strap 13, while the extremities of the rod are connected to the bolts 24 in the U-shaped straps 20 and 21 by having the ends turned around the same as indicated at 30 and 31.

At the extremities of the cross bar 10, I employ clevis members 32 and 33. These members are similarly but oppositely constructed, and each includes a strap member 34 adapted to lie against one edge of the cross bar, and a strap 35 to lie against the opposite edge of the cross bar by which straps each clevis is suitably secured to the cross bar by means of bolts, rivets or otherwise. Each clevis also terminates in a set of flanges, preferably an upper and lower flange, the upper flange being indicated at 36 and the lower flange at 37. A bolt 38 passes through the flanges 36 and 37 and carries a roller 39 in each clevis, these flanged portions of the clevises being turned at right angles to the straps so as to extend outwardly or forwardly from the cross bar 10.

Together with the apparatus as hereinbefore described, I employ a series of chains preferably three in number and indicated at 40, 43 and 46. The chain 40 at one end is connected to a trace 41 at the outer side of the right hand animal and is passed over the roller 39 in the clevis 33, and also over the roller 26 in the U-shaped strap 21 so as to be connected to the trace 42 on the right hand side of the central or intermediate animal. Similarly, the chain 43 at the opposite side of the draft equalizer is connected at one end to the trace 44 at the outer side of the left hand animal and passes over the roller 39 in the clevis 32 and also over the roller 26 in the U-shaped strap 20 so that its opposite end may be connected to the trace 45 at the left side of the central or intermediate animal. The chain 46 is connected at one end to the trace 48 at the left side of the right hand animal and passes over the rollers 27 in the U-shaped straps 20 and 21 and at its opposite end is connected to the trace 47 at the right hand side of the other outer animal. It will thus be seen that the outer animals are each connected to the central or intermediate animal and the outer animals are also connected so as to pull with each other, the chains being so run that they are independent of one another, and this feature together with the manner of connecting the U-shaped straps to the cross bar and the U-shaped straps to each other causes the pull to be substantially in a line with the direction of the travel of the load to be drawn and equalizes the work done by the draft animals.

I claim as my invention:

1. A draft equalizer for a three animal team, comprising a cross bar, a central U-shaped strap pivotally connected to the cross bar approximately centrally thereof, auxiliary U-shaped straps also pivotally connected to the cross bar in positions at both sides of the central U-shaped strap, means for connecting the central and auxiliary U-shaped straps so as to cause the same to move in unison relatively to each other and to the cross bar, a roller mounted between the parts of each of the auxiliary U-shaped straps, a bracket secured to each of the auxiliary U-shaped straps, a roller mounted between each bracket and the adjacent part of the corresponding U-shaped strap, a chain passing over a chain slide at one end of the cross bar and over the roller between the parts of the adjacent U-shaped strap, a chain passing over a chain slide at the other end of the cross bar and also over the roller between the parts of the other U-shaped strap, and a chain passing over the rollers between the said brackets and the adjacent parts of the U-shaped strap.

2. A draft equalizer for a three animal team comprising a cross bar, a clevis mounted at each end thereof, a roller fitted in each clevis, a central U-shaped strap pivotally connected to the cross bar at approximately the central portion thereof, means for connecting one end of the U-shaped strap to the load to be drawn auxiliary U-shaped straps also pivotally connected to the cross bar at spaced positions on both sides of the central U-shaped strap, means for connecting the central auxiliary U-shaped straps so as to cause the same to swing in unison relatively to each other and to the cross bar, a roller mounted between the outer parts of each of the auxiliary U-shaped straps, a bracket sesured to and offset from each of the auxiliary U-shaped straps, a roller mounted between each bracket and the adjacent part of its auxiliary U-shaped strap, a chain passing over one clevis and over the roller between the parts of the adjacent U-shaped strap, a chain passing over the roller in the other clevis and over the roller between the parts of the other U-shaped strap, and a third chain passing over the rollers between the said brackets and the adjacent parts of the auxiliary U-shaped straps.

Signed this 30th day of Sept., 1919.

FRANK A. LYON.